United States Patent [19]

Sommer

[11] Patent Number: 4,693,350

[45] Date of Patent: * Sep. 15, 1987

[54] CLUTCH-BRAKE UNIT

[75] Inventor: Gordon M. Sommer, Boca Raton, Fla.

[73] Assignee: Sommer Co., Warren, Mich.

[ * ] Notice: The portion of the term of this patent subsequent to Jan. 15, 1997 has been disclaimed.

[21] Appl. No.: 180,987

[22] Filed: Aug. 25, 1980

Related U.S. Application Data

[63] Continuation-in-part of Ser. No. 9,606, Feb. 5, 1979, abandoned.

[51] Int. Cl.[4] .................... F16D 13/72; F16D 67/04
[52] U.S. Cl. .................. 192/18 A; 192/113 B
[58] Field of Search .................... 192/18 A, 113 B

[56] References Cited

U.S. PATENT DOCUMENTS

| | | | |
|---|---|---|---|
| 1,673,566 | 6/1928 | Himes | 192/113 B X |
| 2,195,778 | 4/1940 | Hill . | |
| 2,441,543 | 5/1948 | Longfield . | |
| 2,743,792 | 5/1956 | Ransom . | |
| 2,788,877 | 4/1957 | Richardson . | |
| 2,836,270 | 5/1958 | Leopold . | |
| 2,944,647 | 7/1960 | Twyman . | |
| 2,956,649 | 10/1960 | Kelley | 192/113 B X |
| 2,998,872 | 8/1961 | Sommer et al. . | |
| 3,020,990 | 2/1962 | Liu . | |
| 3,077,968 | 2/1963 | Ahern et al. . | |
| 3,090,257 | 5/1963 | Schjolin et al. | 192/18 A X |
| 3,104,746 | 9/1963 | Gadd et al. | 192/113 B |
| 3,182,528 | 5/1965 | Lamburn . | |
| 3,339,685 | 9/1967 | Cornwall et al. | 192/18 A X |
| 3,468,402 | 9/1969 | Edwards | 192/18 A |
| 3,494,450 | 2/1970 | Mankowsky et al. . | |
| 3,580,369 | 5/1971 | Heck | 192/113 B X |
| 3,605,963 | 9/1971 | Roob et al. | 192/18 A |
| 3,638,773 | 2/1972 | Lewis et al. | 192/18 A |
| 3,696,893 | 10/1972 | Keivunen | 192/113 B X |
| 3,696,898 | 10/1972 | Sommer | 192/18 A |
| 3,835,971 | 9/1974 | Spanke et al. | 192/18 A |
| 3,924,715 | 12/1975 | Cory | 192/18 A |
| 3,981,381 | 9/1976 | Nosek | 192/113 B X |
| 4,069,906 | 1/1978 | Handke | 192/113 B |
| 4,129,204 | 12/1978 | Hedgcock | 192/18 A X |
| 4,142,619 | 3/1979 | Spokas | 192/113 B |
| 4,183,425 | 1/1980 | Sommers | 192/18 A X |

FOREIGN PATENT DOCUMENTS 718161 3/1942 Fed. Rep. of Germany ... 192/113 B

*Primary Examiner*—Robert R. Mackey
*Attorney, Agent, or Firm*—Harness, Dickey & Pierce

[57] ABSTRACT

There is disclosed herein a clutch-brake unit having a clutch disc pack and a separate brake disc pack which are designed for selective actuation by a single piston arrangement to transmit rotational driving forces from an input shaft to an output shaft via the clutch disc pack and to brake rotation of the output shaft via the brake disc pack as desired. An integral oil pump is provided on the input shaft and cooperates with portions of the housing to provide a high volume centrifugal pumping action to continuously circulate oil through passages provided in the housing, input shaft, output shaft and across the clutch and brake disc pads so as to cool them. In one embodiment, the integral oil pump includes a pump chamber separate from the central cavity formed by the housing and also working chambers for the clutch and brake disc packs are separated from the central cavity by annular inner housings. Provisions are also incorporated whereby the oil flow may be directed to external auxiliary apparatus such as oil cooler if desired.

1 Claim, 8 Drawing Figures

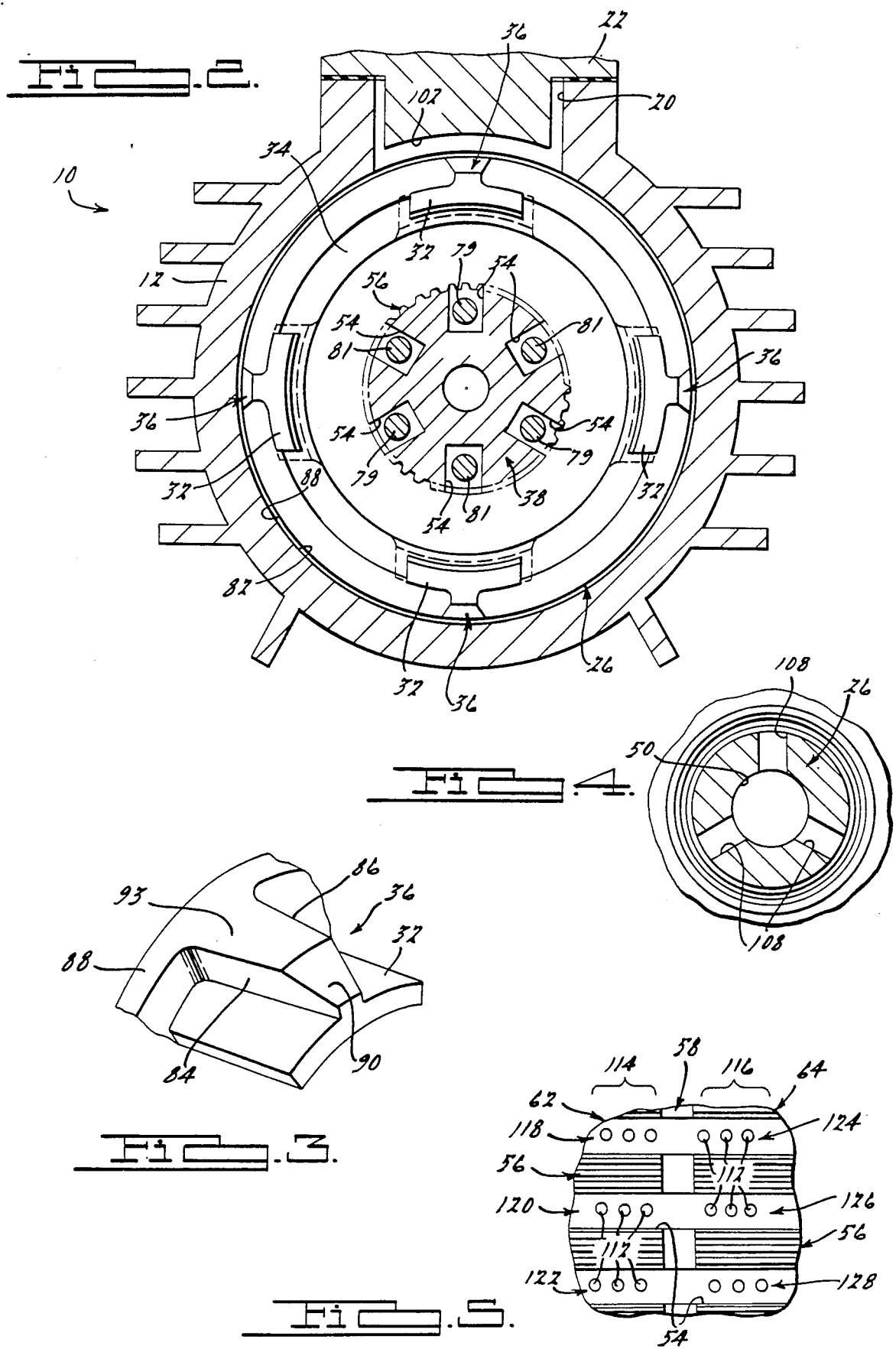

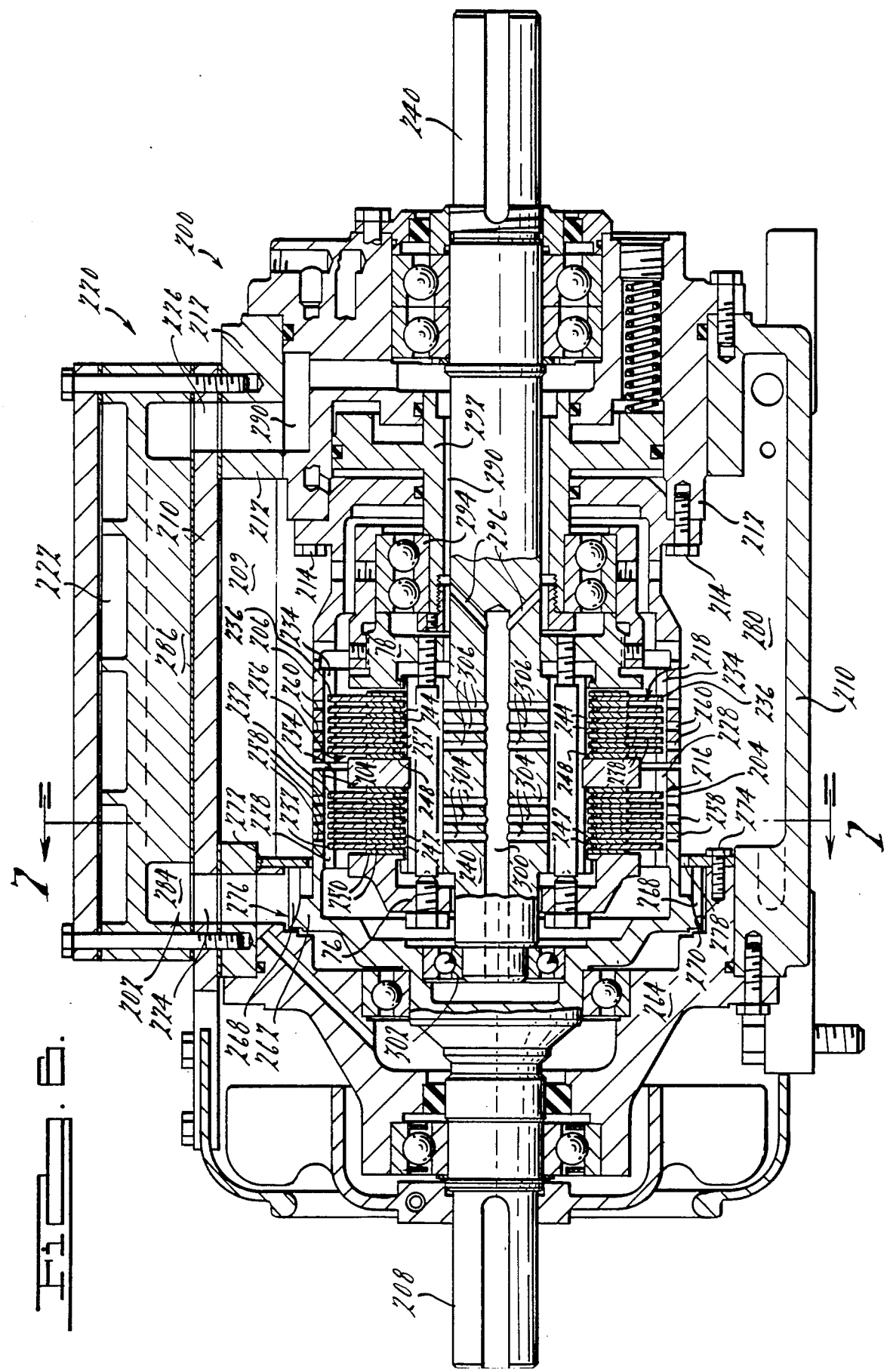

CLUTCH-BRAKE UNIT

CROSS-REFERENCE TO RELATED APPLICATION

This application is a continuation-in-part of U.S. patent application Ser. No. 9,606, filed Feb. 5, 1979, now abandoned.

SUMMARY OF THE INVENTION

The present invention relates generally to a combination clutch-brake unit and more particularly to a new and improved oil submerged clutch-brake unit having integral oil pumping means operative to continuously circulate oil whenever the unit is operating.

Clutch-brake units of various types have long been employed to transmit rotational energy between a power source and equipment to be driven thereby. Such units are generally employed so as to provide means for alternately stopping and starting such driven equipment without requiring the shutting down of the power source thereby conserving power as well as enabling other equipment which may be driven by a common power source to be operated. The inclusion of the braking features enables more rapid deceleration of the output shaft than that provided by friction alone.

During operation and particularly during initial periods of clutch actuation and braking such clutch-brake units generate high amounts of heat and wear between the respective torque transmitting surfaces. Accordingly, it is desirable to provide means to both lubricate and cool these surfaces. However, for reasons of economy both in maintenance and operation as well as in required investment, it is desirable to avoid the addition of auxiliary pumping equipment to supply this lubricant.

Accordingly, the present invention provides an improved clutch-brake unit having an integral high volume centrifugal oil pumping means provided on the input shaft which is in operation whenever the input shaft is rotating. Oil passage means are also provided for continuously circulating the oil through the unit and dispersing the oil over substantially all of the torque transmitting surfaces thereby preventing any excessive localized wear. Additionally, provisions are also made whereby the oil pumping means may be effective to circulate all or a portion of the oil through external auxiliary apparatus such as an oil cooler or filtration equipment, for example. Thus, the present invention provides a durable clutch-brake unit requiring substantially less maintenance as well as eliminating the need for auxiliary external pumping apparatus to circulate lubricant. Further, the reduced maintenance affords indirect cost savings to users of the present invention by insuring that the driven equipment will be available for operation a greater percentage of the time.

In an alternative preferred embodiment, the above features are provided along with a separate pump chamber for the integral high volume centrifugal oil pumping means to provide more efficient pumping. The integral pump within the separate pump chamber is also designed to be manufactured by a relative low cost operation. Working chambers separate from the central cavity of the main housing are also provided by annular inner housings to increase the efficiency of the clutch-brake unit.

Additional advantages and features of the present invention will become apparent from the subsequent description and the appended claims taken in conjunction with the accompanying drawings.

BRIEF DESCRIPTION OF THE DRAWINGS

FIG. 2 is a transverse cross-sectional view of the clutch-brake unit of FIG. 1, the section being taken along line 2—2 thereof;

FIG. 3 is a fragmentary perspective view of an impeller vane provided on the input shaft;

FIG. 4 is a fragmentary radial cross-sectional view of the input shaft, the section being taken along line 4—4 of FIG. 1;

FIG. 5 is a developed view of a portion of the output shaft illustrating the arrangement of the radial oil outlet passages provided therein;

FIG. 6 is a longitudinal side sectional view partially broken away of an alternative preferred embodiment of a clutch-brake unit in accordance with the present invention;

DESCRIPTION OF THE PREFERRED EMBODIMENTS

Figure 1:
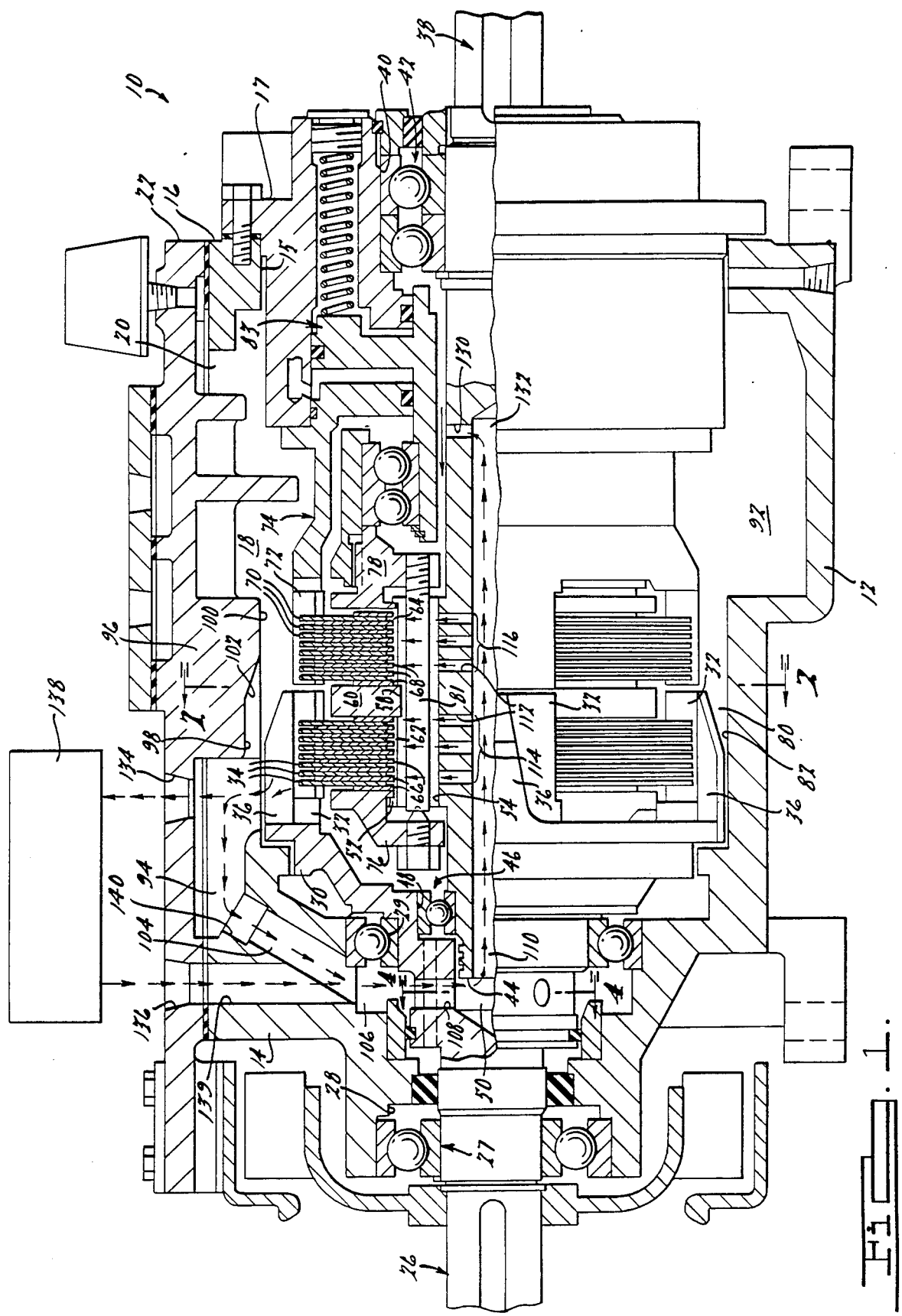
FIG. 1 is a longitudinal side sectional view partially broken away of a clutch-brake unit in accordance with the present invention.

Referring now to FIGS. 1 to 5, a clutch-brake unit in accordance with the present invention is indicated generally at 10 and comprises a generally cylindrically shaped housing 12 having opposed longitudinally spaced end walls 14 and 16 which partially define an interior cavity 18 therebetween. End wall 16 has a large opening 15 provided therein which is closed by a removable end wall 17. Housing 12 also has a longitudinally extending opening 20 at the top thereof which is closed by means of a cover plate 22 secured to housing 12 in any suitable manner such as by a plurality of bolts or the like. Housing 12 may also be provided with outwardly projecting external heat radiating fins if desired to assist in dissipating heat generated during operation of the clutch-brake unit.

An input shaft 26 extends into cavity 18 through an opening 28 provided in end wall 14 and is rotatably journaled therein by means of bearings 27 and 29. Input shaft 26 is provided with an enlarged diameter annular supporting section 30 at its inner end from which a plurality of drive lugs 32 project axially outward. As illustrated, clutch-brake unit 10 is provided with four drive lugs 32 substantially equally spaced around supporting section 30 although it should be noted that a greater or lesser number of such drive lugs may be provided for larger or smaller capacity clutch-brake units. A plurality of friction clutch plate members 34 are mounted on drive lugs 32 and extend radially inward therefrom. Also, a plurality of oil pump impeller vanes 36 are provided on drive lugs 32 extending generally radially outwardly therefrom and substantially coextensive therewith.

An output shaft 38 extends into cavity 18 through an opening 40 provided in removable end wall 17 and is rotatably supported therein by a suitable bearing assembly 42. Output shaft 38 is coaxial with input shaft 26 and has an inner end portion 44 rotatably supported by a bearing 46 engaging an annular radially inwardly facing shoulder 48 provided on input shaft 26, end portion 44 projecting partially into an axially extending bore 50 provided in input shaft 26. Output shaft 38 has an enlarged diameter portion 52 having a plurality of axially extending circumferentially spaced slots 54 provided therein and a plurality of relatively shallow, axially extending notches 56 intermediate slots 54. An annular notch 58 is also provided approximately midway along portion 52 in which is fitted a split snap ring 60 which divides portion 52 into a clutch disc portion 62 and brake disc portion 64. A plurality of clutch discs 66 and brake discs 68 are each provided with complementary notches which interfit within notches 56 and are mounted upon respective portions 62 and 64 so as to be rotatable with output shaft 38.

A plurality of friction brake plates 70 are supported upon a plurality of axially projecting brake lugs 72 extending outward from a support member 74 non-rotatably secured to and supported from removable end wall 17. As illustrated in FIG. 1, clutch plates 34 are interposed between friction clutch discs 66 and brake plates 70 are interposed between friction brake discs 68.

An annular clutch actuating member 76 is disposed adjacent the outer end of clutch disc portion 62 and operatively connected to a brake actuating member 78 disposed adjacent the outer end of brake disc portion 64 of output shaft 38. Brake actuating member 78 and clutch actuating member 76 are interconnected by a plurality of screws 79 and rods 81 arranged in alternating relationship and extending through slots 54 in such a manner as to fixedly retain actuating members 76 and 78 in a predetermined spaced relationship. A piston actuating means, indicated generally at 83, is operatively connected to and adapted to impart axial movement to actuating members 76 and 78 so as to thereby actuate either the clutch or brake portion of clutch-brake unit 10. The operation of clutch-brake unit 10 and additional structural details thereof are substantially identical to that described in U.S. Pat. No. 3,696,898 entitled Clutch-Brake Unit and assigned to the same assignee as the present application which disclosure is hereby incorporated by reference thereto.

As best seen with reference to FIG. 2, cavity 18 has a generally cylindrical portion 80 centrally disposed between end walls 14 and 16 and surrounding clutch discs and plates 66 and 34 and brake discs and plates 68 and 70. As shown, the diameter of portion 80 is such as to place interior wall portion 82 in close proximity to impeller vanes 36 and to cooperate therewith to provide a high-volume centrifugal oil pumping action.

As best seen with reference to FIG. 3, an impeller vane 36 is preferably integrally formed with each drive lug 32 and comprises a radially outwardly extending protrusion defined in part by circumferentially spaced radially outwardly diverging side walls 84 and 86 extending axially outward from annular flange portion 88 provided on support section 30. The outer end of impeller vane 36 includes a beveled or radially inwardly inclined surface 90 which serves to facilitate oil flow into the vanes such as from brake plates and discs as well as from reservoir 92 provided in the lower portion of housing 12 thereby assisting the pumping action thereof. The radially outer surface 93 of impeller vane 36 is convex in shape having a radius of curvature equal to the radius of the arc scribed by each vane during rotation of the input shaft.

Vanes 36, in cooperation with cylindrical shaped portion 80, act to pump oil from reservoir 92 to a pumping chamber 94 provided at the top of housing 12 and being defined in part by a depending projection 96 integrally formed on cover plate 22. Projection 96 has a first concave surface 98 overlying and radially spaced from the path of impeller vanes 36, a second concave surface 100 overlying brake plate members 70 and an inclined surface 102 also concave in transverse cross-sectional shape interconnecting surfaces 98 and 100 which operate to assist in directing oil flowing radially outward from brake plate members 70 into pumping chamber 94.

An oil outlet passage 104 is provided in housing 12 extending from the left end (as seen in FIG. 1) of pumping chamber 94 radially inwardly and axially to the left to an annular space 106 adjacent bearing 29 and surrounding input shaft 26. Input shaft 26 is provided with a plurality of radially inwardly extending oil passages 108 in fluid communication with space 106 and cylindrical bore 50 provided in input shaft 26 into which end portion 44 of output shaft 38 is interfitted. Preferably input shaft 26 will have three equally spaced radial passages 108. Output shaft 38 is provided with an axially extending passage 110 opening outward from end portion 44 into bore 50 which passage is preferably coaxial with the axis of rotation of output shaft 38.

A plurality of radially outwardly extending oil outlet passages 112 are also provided along output shaft 38, a first series 114 thereof being positioned in radial alignment with clutch plates 34 and clutch friction discs 66 and a second axial spaced series 116 being positioned in radial alignment with brake plates 70 and brake friction discs 68. Each of these passages 112 open into selected axially extending slots 54 provided on enlarged diameter portion 52 of output shaft 38.

As best seen with reference to FIG. 5, the first series 114 of radial oil outlet passages 112 comprises three substantially equally circumferentially spaced groups 118, 120 and 122, each group comprising three such axially spaced passages 112. Each group 118, 120 and 122 is staggered or shifted slightly in an axial direction such that no two passages 112 have openings which are circumferentially aligned. Similarly, the second series 116 of radial oil outlet passages 112 also comprises three substantially equally circumferentially spaced groups 124, 126, and 128, each comprising three passages 112. Again, each group is shifted in an axial direction slightly so that no two passages 112 have openings which are circumferentially aligned. This staggering of oil outlet passages 112 insures that an adquate supply of oil is directed between and over each of the clutch and brake plates 34 and 70 and clutch and brake friction discs 66 and 68.

An additional radial outwardly extending oil outlet passage 130 is also provided at the terminal end 132 of axial passage 110 which operates to provide lubricating oil to bearing assembly 42 as well as to the area of interface between that piston asembly 83 and output shaft 38.

Referring once again to FIG. 1, for large capacity clutch-brake units additional external cooling may be required or it may be desirable in some units to circulate the oil through other auxiliary external apparatus such as filtration equipment or the like. Accordingly, cover plate 22 is provided with a pair of spaced openings 134 and 136 to which suitable conduits may be connected via appropriate fittings to conduct oil to such auxiliary apparatus as an oil cooler 138. As shown, opening 134 opens directly into pumping chamber 94 and operates to allow oil flow to oil cooler 138. Opening 136 communicates with a downwardly or radially inwardly extending passage 139 provided in housing 12 which operates to direct the oil to space 106. While passages 104, 139 and opening 134 and 136 may be sized so as to direct only a portion of the oil through oil cooler 138, passage 104 may also be provided with an enlarged diameter portion 140 adjacent pumping chamber 94 which is adapted to receive a plug thereby totally closing off passage 104 and insuring substantially all oil flow will be directed through oil cooler 138.

Referring now to the overall operation of the clutch-brake unit 10 embodying the principles of the present invention, it will be seen that the torque transmitting portion of the clutch is characterized by an alternate arrangement of a plurality of clutch plate members 34 and a plurality of clutch friction discs 66, with one of the discs 66 being disposed adjacent the face of the clutch actuating member 76 and another of the discs 66 being disposed adjacent the side of the center ring 60. These torque transmitting elements within housing 12 are intended to be rotatable in a bath of oil contained within the housing 12, with the result that a substantially high percent of the kinetic energy produced in starting and stopping heavy loads is transmitted by "shearing" the oil between the various friction plates, thus substantially increasing not only the life of these friction plates over those in clutch and brake units which operate dry, but also increasing the maximum operating speed of the unit 10 of the present invention. The high volume centrifugal oil pump described above operates to insure an adequate supply of oil across the clutch plates 34, brake plates 70, clutch friction discs 66, and brake friction discs 68.

When input shaft 26 rotates, pump vanes 36 will operate to begin circulating oil from reservoir 92 to pumping chamber 94 then through either openings 134 and 136 or passage 104 to space 106 and through radial passages 108 in input shaft 26. Oil will then flow through axial passage 110 in output shaft 38 to radial outlet passages 112 and outwardly over the clutch and brake plates 34 and 70 and clutch and brake friction discs 66 and 68, respectively. It should be noted that while vanes 36 will generate sufficient pressure to insure adequate oil flow, the oil flow across the plates and discs will be assisted by the centrifugal force generated by rotation of the output shaft 38. As input shaft 26 will be continuously rotating whenever the clutch-brake unit is in operation, the provision of impeller vanes thereon insure that an adquate supply of oil is provided to the clutch plates and discs at all times including when output shaft just begins to rotate, the high heat generating period.

Once input shaft 26 has begun to rotate and the impeller vanes provided thereon have begun circulating the oil as described above, piston assembly 83 may be actuated thereby causing simultaneous axial movement of brake actuating member 78 and clutch actuating member 76 to the right as seen in FIG. 1. This movement will release brake plates 70 and brake friction discs 68 which have heretofore prevented rotation of output shaft 38. Further movement will then cause clutch plates 34 and clutch friction discs 66 to move together between the sides of clutch actuating member 76 and ring 60 into torque transmitting relationship. Output shaft 38 will then begin to rotate as the slippage between clutch plates 34 and discs 66 decreases. As input shaft 26 is continuously rotating at full or nearly full speed, a continuous supply of oil is distributed via passages 112 between each of the clutch plates and discs thereby serving to both lubricate and cool them. In order to shut down the clutch-brake unit, the above procedure is merely reversed with deactivation of piston assembly 83 allowing axial movement of actuating members 76 and 78 to the left as seen in FIG. 1 thereby releasing clutch plates and discs 34 and 66 and drawing brake plates 70 and discs 68 together to provide a braking torque to output shaft. Again, as input shaft 26 continues to rotate at full speed, an adequate supply of oil will be directed across brake plates 70 and discs 68 to cool and lubricate them during the entire braking operation.

Figure 7:
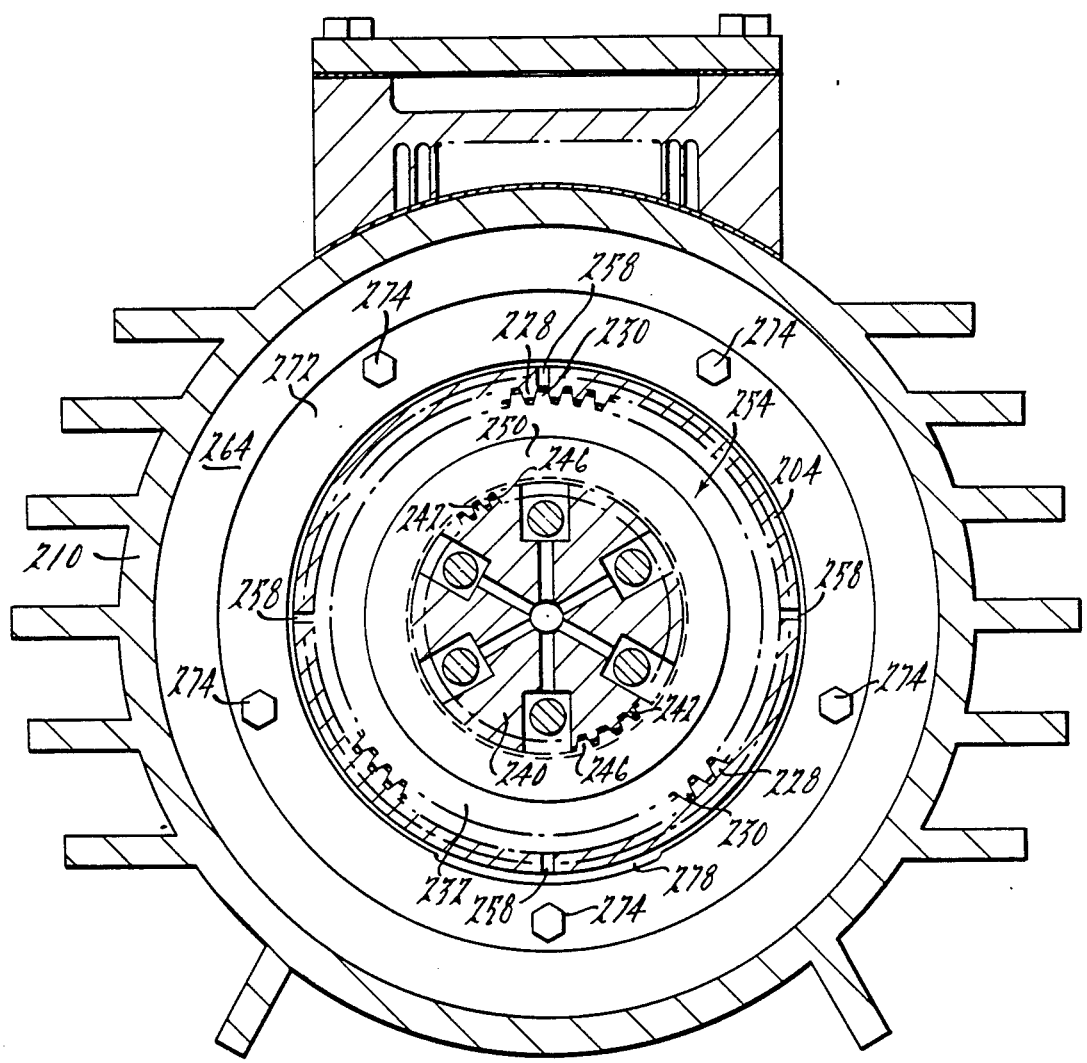
FIG. 7 is a transverse cross-sectional view of the clutch-brake unit of FIG. 6 taken along line 7—7 thereof.
Figure 8:
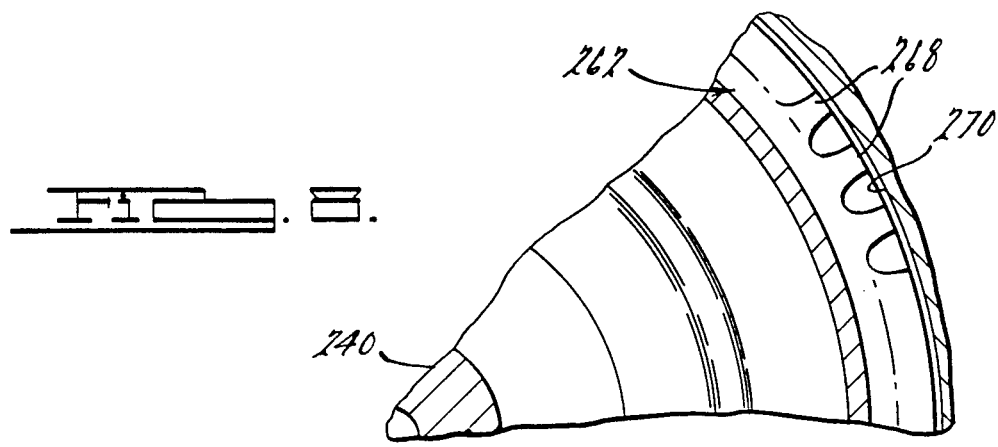
FIG. 8 is an elevated view of a portion of the vane pump of FIG. 6 in the direction of lines 8—8 thereof.

An alternative preferred embodiment of the present invention is shown in FIGS. 6 through 8. The clutch-brake unit 200 is identical in structure and operation with the clutch-brake unit 10 illustrated in FIG. 1, except for an improved oil pumping means and passageway system 202 and an improved two-piece inner housing 204, 206 within the central cavity 209 of the external housing 210, one part an extended portion 204 of the input shaft 208 and the second part an annular inner housing 206 attached in a stationary position to the external housing 210 of the unit 200 at sidewall 212 by bolts 214 at circumferentially spaced locations to improve the efficiency of the shearing effect of the clutch 216 and brake 218, respectively. In the embodiment illustrated in FIG. 6, an optional modular oil cooler 220 in the form of a water cooling jacket 222 is also included. Although ports 224, 226 are illustrated in use with the modular oil cooler 220, the oil ports 224, 226 may be, in the alternative, operably associated with any of a variety of conventional oil coolers available in the art.

Again, the operation of the clutch-brake unit 200 and additional structural details thereof are substantially identical to that described in U.S. Pat. No. 3,696,898, entitled Clutch-Brake Unit, and assigned to the same assignee as the present application which disclosure is hereby incorporated by reference thereto. Additional details have also been described by the prior identified embodiment that are applicable to the present embodiment.

The extended portion 204 connected to the input shaft 208 has internal splines 228 which correspond to and operably engage teeth 230 on the outer periphery of friction clutch plate members 232. Likewise, the stationary inner housing 206 has internal splines 234 which correspond to and operably engage teeth 236 on the outer periphery of friction brake plates 238. The output shaft 240 has similar splines 242, 244 extending axially at circumferentially spaced locations along the outer periphery thereof which correspondingly engage teeth 246 and 248 respectively, on the inner periphery of the corresponding clutch friction discs 250 and brake friction discs 252 of the unit 200. Two annular working chambers 254 and 256 are formed by the inner housing 204 and 206 and the output shaft 240 to permit more pressure to build up in the "shearing" process, whereby more effective clutching and braking occurs. Each of the housings 204, 206 also include flow ports 258 and 260, respectively, at circumferentially spaced locations to aid in the circulation of the oil through the working chambers 254 and 256. The tooth and spline construction described for the plates 232, 238 and discs 250, 252 permits axial movement directed by the actuating members 76 and 78 as described above. Circumferential movement, however, is strictly limited by the tooth and spline construction.

An impeller vane pump 262 is disposed between the sidewall 264 of the unit 200 and the extended portion 204 of the input shaft 208 and is integrally formed with the input shaft 208. The pump 262 is comprised of a plurality of vanes 268 which are a series of circumferentially spaced, rough-cut gear teeth, the design of which is illustrated in FIGS. 6 and 8. The vanes 268 are formed integrally with the outer periphery of the input shaft 208. The vanes 268 are constructed to be closely fit with a small clearance with the walls 264, 270 within which the vanes 268 are operably disposed to eliminate any bleed. The illustrated construction of the vanes 268, however, is relatively inexpensive to manufacture since although the diameter and axial thickness are specified within relatively close tolerances, the vanes 268 themselves are rough cut. An annular plate 272 is secured to the outer housing 210 of the unit 200 by a series of circumferentially spaced bolts 274, wherein the plate 272 and the walls 264, 270 of the housing 210 around the input shaft 208 form a pump chamber 276. A circumferentially extending slot 278 is disposed in the plate 276 to communicate the pump chamber 276 with the oil reservoir 280 as the inlet port to the pump chamber 276. Above the vane pump 266 and pump chamber 276 is located an oval-shaped outlet port 224, which is the inlet to the oil cooler 220 having a passageway 284 for the oil, which passes along a series of longitudinally extending fins 286 to transfer heat from the oil to the water cooling jacket 222 through which cooling water is circulated. The oil cooling passageway 284 has an outlet port 226 back into the lubrication system 290 of the unit 200, entering along the piston 292 and travelling axially along said output shaft 240. Oil is subsequently ported either directly into the working clutch and brake chambers 254, 256, into the intermediate outlet shaft support bearing 294, or into the output shaft 240 through passageways 296, into axial passage 300. The oil ported through axial passage 300 will either lubricate the output shaft 240 and support bearing 302 at the end of the shaft 240, or be directed into the working clutch and brake chambers 254, 256 from below the clutch 250 and brake 252 discs through passages 304 and 306, which are circumferentially spaced and offset as previously described with respect to the prior disclosed embodiment.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

What I claim is:

1. A clutch-brake unit comprising:
   an external housing, defining a central cavity between opposite longitudinally spaced end walls, having an oil reservoir in a lower portion thereof;
   an input shaft extending into said cavity and rotatably journaled in one of said end walls, and having an enlarged diameter, annular extended portion provided thereon, said extended portion having,
   a series of circumferentially spaced axially extending splines directed radially inwardly along the internal surface thereof, and
   a plurality of integral radially outwardly directed vanes comprising gear teeth spaced circumferentially along a portion of the outer surface thereof;
   oil passage means;
   a pumping chamber enclosing the portion of said extended portion of said input shaft having said vanes, said pump chamber being separate from said central cavity, having an inlet port communicating with said reservoir, and having an outlet port communicating with said oil passage means;
   a series of clutch plates having teeth at the outer periphery thereof wherein said plates are mounted at said teeth to the splines of said input shaft extended portion and said extended portion forms a clutch working chamber around said clutch plates;
   an output shaft coaxial with said input shaft, extending into said cavity and rotatably journaled in the other of said end walls, said output shaft having an end portion interfitted within a portion of said input shaft, having a series of circumferentially spaced axially extending splines directed radially outwardly along the outer surface thereof, an axially extending oil passage opening out of said end portion, and radial passages extending outwardly from said axial passage;
   a stationary annular inner housing fixedly mounted to said external housing;
   a series of brake plates nonrotatably mounted within said stationary annular inner housing, said inner housing forming a brake working chamber around said brake plates;
   first and second series of friction discs, having teeth along the inner periphery thereof, said discs mounted in axial spaced relationship on said output shaft wherein said teeth of said discs engage said splines of said output shaft, said first series of discs adapted to cooperate with said clutch plates when actuated to transmit rotational energy from said input shaft to said output shaft and said second series of discs adapted to cooperate with said brake plates when actuated to brake rotational movement of said output shaft;
   actuating means for selectively actuating one of said first or second series of friction discs;
   said vanes being operative to pump oil from said reservoir through said pump chamber, said oil passage means, said axial passage, said radial passages and across said clutch plates, said brake plates and said first and second series of friction discs in response to the rotation of said input shaft.

* * * * *